Aug. 8, 1967  M. M. SURI  3,334,596
RAILWAY TRUCK WHEEL ASSEMBLY
Filed Oct. 28, 1964
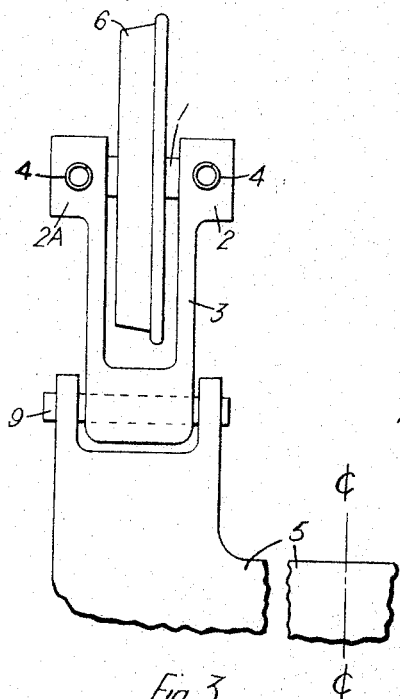
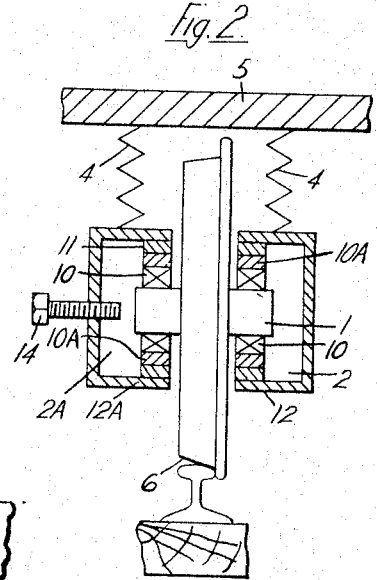
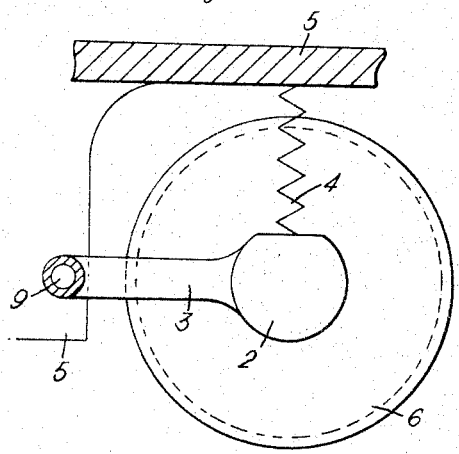
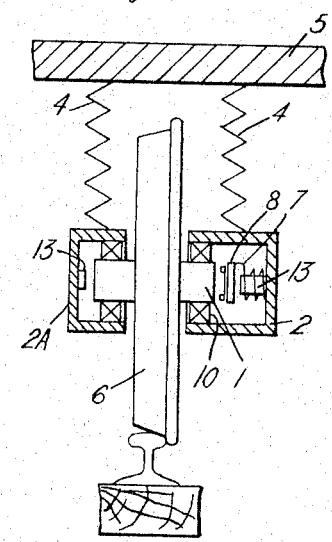
Inventor
MAN MOHAN SURI
By Hammond & Littell
Attorneys

United States Patent Office 3,334,596
Patented Aug. 8, 1967

3,334,596
RAILWAY TRUCK WHEEL ASSEMBLY
Man Mohan Suri, Durgapur, West Bengal, India (Joint Director (Diesels), Research Design and Standardisation Organisation, Ministry of Railway, Alambagh, Lucknow, India)
Filed Oct. 28, 1964, Ser. No. 407,054
1 Claim. (Cl. 105—180)

The invention relates to means for the improvement of riding qualities of rail vehicles by means provided for reducing lateral accelerations of the wheels and also reducing vertical and lateral stresses caused in the track by interaction of wheels with the track while the vehicle is running at high speeds.

According to the existing practice, the wheel-axle assembly of the railway vehicle consists of a single axle with two fixed wheels mounted one at each end. This results in a fixed distance being maintained between the two wheels which permits the wheel flanges to guide the wheel-axle on the rails. However, while the distance between the wheel flanges remains fixed, the distance between the rails varies according to the track conditions, from place to place, within the plus-minus tolerance specified by the railway administration. The total clearance between the wheel flanges and the rails keeps varying along the track.

Further, in order to obtain steady riding conditions, the wheel tread is given some conicity or taper which prevents the wheels from hunting or moving from side to side as would easily occur if the wheel tread was absolutely cylindrical. Whereas this conicity has definite advantage in preventing unrestricted sideways motion of the wheel-axle assembly, it results, under any lateral disturbing forces, in harmonic motion of the wheel-axle assembly with a definite period of oscillation so that the wheel-axle assembly moves along a sinuous path moving first to one side with the wheel flange hitting the corresponding rail and then moving the other side till the opposite wheel flange hits the other rail. This motion of the wheel-axle assembly results in certain lateral forces exerted by the wheel-flange against the track, and the higher the speed the greater are the lateral forces applied on account of this feature. The intensity of the lateral forces also increases with the increase in the amplitude of this harmonic motion, i.e. the greater the total sideways clearance between the wheel flanges and the track, the greater are the lateral forces on the track and more rough becomes the riding of the vehicle. For this reason rigid standards have to be maintained for track gauge tolerance and for the wheel flange distances. This however has practical limits, especially as flanges are subject to wear and the clearances between the rails cannot be maintained at a specified minimum.

A second problem in high speed running is the permissible vertical stresses in the rails caused by the motion of the wheels on the rails which vertical stresses also increase with the speed according to the known phenomenon of dynamic augment. More important than this is the undesirable effect of unsprung masses on track irregularities. The track suffers severe battering from unsprung masses of the vehicle whenever any irregularity is met, or when going over the rail joints. The intensity of the hammering and its resultant stresses are increased with increased weight of unsprung masses. The sprung masses do not act on the track irregularities with the same intensity depending upon spring characteristics of the suspension.

This invention proposes means to (a) prevent the lateral harmonic motion of the wheel-axle assembly, (b) restrict the amplitude of any lateral displacements by restriction of the clearance between the rail and the wheel for either of the two wheels, (c) reduce the weight of the total unsprung masses.

According to this invention the objective at (a) is achieved by splitting the present wheel axle assembly into independent wheels each mounted on its own stub axle, the objective at (b) is achieved by providing axle thrust on the wheel which displaces the wheel outwards to the extent necessary, thus overcoming the lateral forces due to conicity or taper of the wheel tread, thereby constantly tending to bring the wheel flange closer to the rail, reducing the effect of wheel rail clearance to the minimum desired by making each individual wheel follow the individual alignment of the two corresponding rails and the objective at (c) is achieved with the split axle arrangement as the unsprung masses of each stub axled wheel are less than half of those of conventional wheel-axle assembly.

Thus in accordance with this invention in the improved railway vehicle each wheel is mounted on its own independent stub axle and means are provided in combination with the said wheel for causing lateral thrust on the wheel by the help of a spring or springs acting laterally on the said wheel thereby constantly tending to displace to the extent necessary, the flange of the wheel closer to the rail on which it is traversing.

The invention will now be more fully described with reference to the accompanying drawings in which:

FIG. 1 shows a plan view of a part of the bogie frame supporting one of the wheels, similar arrangement being provided for all the wheels.

FIG. 2 shows in a front view partially in section of one of the wheels with the arrangement according to this invention.

FIG. 3 shows a schematic end view of FIG. 2.

FIG. 4 shows another modification using a different type of biasing spring.

Referring to the drawings, the conventional wheel 6 with conicity or taper has its independent stub axle 1 contrary to the normal arrangement of a continuous railway axle supporting the two opposite wheels.

The stub axle 1 is housed at its two ends in axle bearing housings 2 and 2A which housings can in one convenient arrangement be an integral part of a fork shaped bracket 3 which in one form can be attached to the bogie frame 5 through a pivoting pin 9. The suspension for vertical movement of the wheel between the bogie frame 5 and the axle bearing housings 2 and 2A is provided by means of coil springs 4 or by the usual leaf springs or rubber springs or combination thereof.

Referring to the arrangement in FIG. 2, between the inside of the circular walls 12 and 12A of the axle bearing housings 2 and 2A and the outer races 10A of the axle bearings 10, there are provided rings or linings 11 of rubber or other synthetic resilient plastic material which constantly provide the end thrust to the wheel through the axle, by virtue of prestressing of the said resilient material in lateral sheer.

As a result of the provision of plastic resilient lining 11 around the outer race 10A of the axle bearing 10, vertical shocks are also absorbed tending to increase the life of the roller bearings. In this construction a prestressing bolt 14 is provided in the housings 2A which when tightened will move the axle along its centre line, thereby stressing the resilient lining 11 laterally in sheer. Thus if the rail gauge is L, and lateral prestressing desired is XL according to the characteristics of the resilient material and according to the requirements of the riding quality desired of the vehicle, the bogie assembly is so made that each wheel, when the bolt 14 is withdrawn, is at a distance of L/2 plus XL from the centre line of the bogie.

The bolt 14 will then be tightened to bring the wheel to a distance $L/2$ from the centre line of the bogie. Once the bogie is placed on the rails, the bolt 14 is released. Thereafter the wheel is under the influence of the wheel profile incline resting on the rail as one lateral force being opposed by the lateral force exerted by the pre-stressed resilient material 11 which had been laterally displaced in sheer to an extent XL.

Referring to the arrangement shown in FIG. 4 within the inner housing 2 is fitted a coiled spring 7 which provides an outward thrust on the stub axle 1 through an end thrust pad 8. This spring tends to move the axle outwardly in relation to the bogie frame. The stops 13 limit the total sideways movement of the wheel axle assembly. These stops are fitted at the inside of the end walls of the housings. The function of the coiled spring 7 can also be achieved by the provision of a leaf spring or a rubber spring (not shown).

In all these embodiments it is understood that the total lateral movement permitted of the stub axles will be limited by means such as stops 13 provided in the axle bearing housings, to limits of tolerances prescribed by various railroads over their normal gauges.

What is claimed is:

A railway vehicle comprising an understructure and wheels and means for mounting the wheels, said means comprising an independent stub axle for each wheel, a housing for each stub axle on each side of the wheel, a race in each housing, bearings on the ends of the stub axle and a material from the group consisting of a spring ring, a lining of rubber and a lining of synthetic resilient material between the race of the axle bearing and the housing, means for applying thrust on the stub axle provided with the housing with the object of causing pre-stressing of said material from the group consisting of a spring ring, a lining of rubber and a lining of synthetic resilient material, the pre-stressing being effected before the wheels are lowered on the rails, the freely supported wheel gauge being larger than the track gauge before the linings are pre-stressed and only when the said linings have been pre-stressed are the two wheels moved sufficiently inwardly towards each other to reduce their gauge whereafter the wheels are lowered on the rails with wheel flanges riding inside the rail flanges, the means for applying pre-stressing being removable to permit the wheel flanges to move laterally towards the rail flanges because of the residual pre-stressing.

References Cited

UNITED STATES PATENTS

| | | | |
|---|---|---|---|
| 70,492 | 11/1867 | Youmans | 105—182 |
| 167,294 | 8/1875 | Banolas | 105—169 |
| 765,211 | 7/1904 | Thompson | 105—178 X |
| 867,999 | 10/1907 | Norwich | 105—178 |
| 1,652,265 | 12/1927 | Baker | 105—163 |
| 1,974,018 | 9/1934 | Edmunds | 105—180 X |
| 2,097,967 | 11/1937 | Edmunds | 105—364 |

FOREIGN PATENTS 834,255   3/1952   Germany.

ARTHUR L. LA POINT, *Primary Examiner.*

H. BELTRAN, *Assistant Examiner.*